United States Patent
Tsukada

(10) Patent No.: US 9,926,445 B2
(45) Date of Patent: Mar. 27, 2018

(54) NITRILE COPOLYMER RUBBER COMPOSITION

(71) Applicant: ZEON CORPORATION, Tokyo (JP)

(72) Inventor: Akira Tsukada, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/654,179

(22) PCT Filed: Dec. 19, 2013

(86) PCT No.: PCT/JP2013/084018
§ 371 (c)(1),
(2) Date: Jun. 19, 2015

(87) PCT Pub. No.: WO2014/098168
PCT Pub. Date: Jun. 26, 2014

(65) Prior Publication Data
US 2015/0322254 A1    Nov. 12, 2015

(30) Foreign Application Priority Data

Dec. 21, 2012  (JP) ................................. 2012-278939

(51) Int. Cl.
*C08L 33/20* (2006.01)
*C08L 1/02* (2006.01)
*C08L 9/02* (2006.01)
*C08F 220/44* (2006.01)
*C08F 236/12* (2006.01)
*C08L 15/00* (2006.01)

(52) U.S. Cl.
CPC ............ *C08L 33/20* (2013.01); *C08F 220/44* (2013.01); *C08F 236/12* (2013.01); *C08L 1/02* (2013.01); *C08L 9/02* (2013.01); *C08L 15/005* (2013.01)

(58) Field of Classification Search
CPC .. C08L 33/20; C08L 9/02; C08L 15/02; C08L 97/02; C08F 220/44
See application file for complete search history.

(56) References Cited

U.S. PATENT DOCUMENTS

| | | | | | |
|---|---|---|---|---|---|
| 3,388,083 A | * | 6/1968 | Kwok | ................ | B29D 99/0053 264/37.3 |
| 3,697,364 A | | 10/1972 | Boustany et al. | | |
| 8,044,147 B2 | * | 10/2011 | Nagamori | ............. | C08F 236/12 524/556 |
| 8,648,137 B2 | * | 2/2014 | Tsukada | .................... | B32B 1/08 524/445 |
| 8,927,640 B2 | * | 1/2015 | Tsukada | .................... | B32B 1/08 524/445 |
| 2007/0197688 A1 | * | 8/2007 | Tsukada | .................... | C08J 3/226 523/351 |
| 2010/0330319 A1 | * | 12/2010 | Tsukada | .................... | B32B 1/08 428/36.91 |
| 2014/0100332 A1 | * | 4/2014 | Henry | .................... | C08L 77/00 525/54.23 |
| 2015/0099841 A1 | * | 4/2015 | Tsukada | .................. | C08K 3/34 524/450 |

FOREIGN PATENT DOCUMENTS

| | | | |
|---|---|---|---|
| JP | H11-157303 A | | 6/1999 |
| JP | 2004-115637 A | | 4/2004 |
| JP | 2004-231796 A | | 8/2004 |
| JP | 2004230719 A | * | 8/2004 |
| JP | 2004231796 A | * | 8/2004 |
| JP | 2005-146097 A | | 6/2005 |
| JP | 2009-235304 A | | 10/2009 |
| JP | 2010-155883 A | | 7/2010 |

OTHER PUBLICATIONS

Balasuriya, P. W., L. Ye, and Y-W. Mai. "Mechanical properties of wood flake—polyethylene composites. Part I: effects of processing methods and matrix melt flow behaviour." Composites Part A: Applied Science and Manufacturing 32.5 (2001): 619-629.*
Machine translation of JP2004230719, performed in Espacenet on Dec. 4, 2017.*
Machine translation of JP2004231796, performed in Espacenet on Dec. 4, 2017.*
Mar. 18, 2014 Search Report issued in International Patent Application No. PCT/JP2013/084018.
Jul. 25, 2016 Extended European Search Report issued in European Patent Application No. 13865172.4.

* cited by examiner

*Primary Examiner* — Nicholas E Hill
(74) *Attorney, Agent, or Firm* — Oliff PLC

(57) ABSTRACT

A nitrile copolymer rubber composition containing a nitrile copolymer rubber (A) which contains α,β-ethylenically unsaturated nitrile monomer units (a1) 15 to 80 wt %, conjugated diene monomer units (a2) 20 to 85 wt %, and cationic monomer units and/or monomer units able to form cations (a3) 0 to 30 wt %, and flat cellulose particles (B) with an aspect ratio of 30 to 600, wherein a content of the flat cellulose particles (B) is 1 to 200 parts by weight with respect to 100 parts by weight of the nitrile copolymer rubber (A) is provided.

9 Claims, No Drawings

NITRILE COPOLYMER RUBBER COMPOSITION

TECHNICAL FIELD

The present invention relates to a nitrile copolymer rubber composition which gives cross-linked rubber which is excellent in gasoline permeation resistance and tensile strength.

BACKGROUND ART

In the past, rubber which contains α,β-ethylenically unsaturated nitrile monomer units and conjugated diene monomer units or olefin monomer units (nitrile copolymer rubber) has been known as rubber which is excellent in oil resistance. Its cross-linked product is mainly being used as materials for fuel hoses, gaskets, packing, oil seals, and other various rubber products which are used around oils in automobile applications.

On the other hand, in recent years, due to rising global activities to protect the environment, efforts are being made to reduce the amount of evaporation of gasoline and other fuel into the atmosphere. In Japan as well, in fuel hoses, seals, packings, and other applications, not only tensile strength and other mechanical characteristics, but also much better gasoline permeation resistance is being sought.

As opposed to this, Patent Document 1 discloses, as a nitrile copolymer rubber composition which gives a cross-linked product which is improved in gasoline permeation resistance, a nitrile copolymer rubber composition which contains a nitrile copolymer rubber which has α,β-ethylenically unsaturated nitrile monomer units 10 to 65 wt %, conjugated diene units 15 to 89.9 wt %, and cationic monomer units and/or monomer units able to form cations 0.1 to 20 wt % and a flat shaped inorganic filler with an aspect ratio of 30 to 2,000.

However, in the art of this Patent Document 1, to make the obtained cross-linked rubber excellent in gasoline permeation resistance and tensile strength, when preparing the nitrile copolymer rubber composition, it is necessary to mix the nitrile copolymer rubber and the flat shaped inorganic filler in the state of an aqueous dispersion. There was the problem that the production process was therefore troublesome. For this reason, from the viewpoint of streamlining the production process, a nitrile copolymer rubber composition which can give cross-linked rubber which is excellent in gasoline permeation resistance and tensile strength even when directly mixing a nitrile copolymer rubber and flat shaped filler to be included in the nitrile copolymer rubber directly in a dry state has been sought.

PRIOR ART DOCUMENTS

Patent Documents

Patent Document 1: Japanese Patent Publication No. 2009-235304A

SUMMARY OF THE INVENTION

Problem to be Solved by the Invention

The present invention was made in consideration of such an actual situation and has as its object the provision of a nitrile copolymer rubber composition which can give cross-linked rubber which is excellent in gasoline permeation resistance and tensile strength. In particular, the present invention has as its object the provision of a nitrile copolymer rubber composition which can be produced by mixing in the dry state and which gives cross-linked rubber which is excellent in gasoline permeation resistance and tensile strength.

Means for Solving the Problems

The inventors engaged in in-depth research to achieve the above object and as a result discovered that the above object can be achieved by a nitrile copolymer rubber composition which contains a nitrile copolymer rubber which has α,β-ethylenically unsaturated nitrile monomer units, conjugated diene monomer units, and cationic monomer units and/or monomer units able to form cations in a predetermined ratio and flat cellulose particles with an aspect ratio of 30 to 600 and thereby completed the present invention.

That is, according to the present invention, there is provided a nitrile copolymer rubber composition containing a nitrile copolymer rubber (A) which contains α,β-ethylenically unsaturated nitrile monomer units (a1) 15 to 80 wt %, conjugated diene monomer units (a2) 20 to 85 wt %, and cationic monomer units and/or monomer units able to form cations (a3) 0 to 30 wt %, and flat cellulose particles (B) with an aspect ratio of 30 to 600, wherein a content of the flat cellulose particles (B) is 1 to 200 parts by weight with respect to 100 parts by weight of the nitrile copolymer rubber (A).

Preferably, a ratio of content of the cationic monomer units and/or monomer units able to form cations (a3) is 0.1 to 30 wt % in the nitrile copolymer rubber (A).

Preferably, the nitrile copolymer rubber (A) is a hydrogenated nitrile copolymer rubber where at least part of the carbon-carbon unsaturated bond parts is hydrogenated.

Preferably, the nitrile copolymer rubber composition further comprises 10 to 150 parts by weight of a vinyl chloride resin and/or acrylic resin with respect to 100 parts by weight of the nitrile copolymer rubber (A).

Preferably, the flat cellulose particles (B) have a volume average particle size of 0.05 to 100 μm.

Preferably, the nitrile copolymer rubber composition is obtained by mixing the nitrile copolymer rubber (A) 100 parts by weight and the flat cellulose particles (B) 1 to 200 parts by weight in a dry state.

Further, according to the present invention, there is provided a cross-linkable nitrile copolymer rubber composition obtained by adding, to the above nitrile copolymer rubber composition, a cross-linking agent.

Furthermore, according to the present invention, there is provided cross-linked rubber obtained by cross-linking the above cross-linkable nitrile copolymer rubber composition.

The cross-linked rubber of the present invention is preferably a hose, seal, packing, or gasket.

Effects of the Invention

According to the present invention, there are provided a nitrile copolymer rubber composition which gives cross-linked rubber which is excellent in gasoline permeation resistance and tensile strength and cross-linked rubber which is obtained by cross-linking the above composition and which has the above characteristics. In particular, according to the present invention, there are provided a nitrile copolymer rubber composition which can be produced by mixing in a dry state and which gives cross-linked rubber which is excellent in gasoline permeation resistance and tensile strength and cross-linked rubber which is obtained by cross-linking the above composition and which is provided with the above characteristics.

DESCRIPTION OF EMBODIMENTS

Nitrile Copolymer Rubber Composition

The nitrile copolymer rubber composition of the present invention is a composition of a nitrile copolymer rubber which contains a nitrile copolymer rubber (A) which contains α,β-ethylenically unsaturated nitrile monomer units (a1) 15 to 80 wt %, conjugated diene monomer units (a2) 20 to 85 wt %, and cationic monomer units and/or monomer units able to form cations (a3) 0 to 30 wt % and flat cellulose particles (B) with an aspect ratio of 30 to 600, where the content of the flat cellulose particles (B) is 2 to 200 parts by weight with respect to 100 parts by weight of the nitrile copolymer rubber (A).

Nitrile Copolymer Rubber (A)

First, the nitrile copolymer rubber (A) used in the present invention will be explained.

The nitrile copolymer rubber (A) used in the present invention is a rubber which contains α,β-ethylenically unsaturated nitrile monomer units (a1) 15 to 80%, conjugated diene monomer units (a2) 20 to 85 wt %, and cationic monomer units and/or monomer units able to form cations (a3) 0 to 30 wt %.

The α,β-ethylenically unsaturated nitrile monomer which forms the α,β-ethylenically unsaturated nitrile monomer units (a1) is not particularly limited so long as an α,β-ethylenically unsaturated compound which has a nitrile group, but, for example, acrylonitrile; α-chloroacrylonitrile, α-bromoacrylonitrile, and other α-halogenoacrylonitriles; methacrylonitrile and other α-alkylacrylonitriles; etc. may be mentioned. Among these as well, acrylonitrile and methacrylonitrile are preferable. These may be used as single type alone or as a plurality of types together.

The ratio of content of the α,β-ethylenically unsaturated nitrile monomer units (a1) is 15 to 80 wt %, with respect to the total monomer units, preferably 30 to 70 wt %, more preferably 40 to 65 wt %. If the ratio of content of the α,β-ethylenically unsaturated nitrile monomer units (a1) is too low, the obtained cross-linked rubber deteriorates in oil resistance and gasoline permeation resistance. On the other hand, if the ratio of content is too high, the obtained cross-linked rubber becomes inferior in cold resistance and the embrittlement temperature becomes higher.

As the conjugated diene monomer which forms the conjugated diene monomer units, conjugated diene monomers containing 4 to 6 carbon atoms are preferable, for example, 1,3-butadiene, isoprene, 2,3-dimethyl-1,3-butadiene, 1,3-pentadiene, etc. may be mentioned. Among these as well, 1,3-butadiene is preferable. These may be used as single type alone or as a plurality of types together.

The ratio of content of the conjugated diene monomer units (a2) is 20 to 85 wt % with respect to the total monomer units, preferably 29.9 to 69.9 wt %, more preferably 34.7 to 59.7 wt %. If the ratio of content of the conjugated diene monomer units (a2) is too low, the obtained cross-linked rubber ends up falling in rubbery elasticity. On the other hand, if the ratio of content is too high, the obtained cross-linked rubber may be impaired in heat aging resistance or chemical stability.

The monomer which forms the cationic monomer units and/or monomer units able to form cations (a3) is not particularly limited so long as a monomer which forms monomer units which becomes charged plus when the obtained polymer contacts water or an acid aqueous solution. As such a monomer, for example, as a cationic monomer, a monomer which contains a quaternary ammonium base may be mentioned. Further, as a monomer able to form cations, a monomer which has a precursor part (substituent) such as a tertiary amine group which is cationated to an ammonium salt (for example, amine hydrochloride or amine sulfate) when contacting hydrochloric acid, sulfuric acid or another acid aqueous solution may be mentioned.

As specific examples of cationic monomers, a (meth)acryloyloxytrimethyl ammonium chloride [meaning acryloyloxytrimethyl ammonium chloride and/or methacryloyloxytrimethyl ammonium chloride, same below], (meth)acryloyloxyhydroxypropyltrimethyl ammonium chloride, (meth)acryloyloxytriethyl ammonium chloride, (meth)acryloyloxydimethylbenzyl ammonium chloride, (meth)acryloyloxytrimethyl ammonium methylsulfate, or other (meth)acrylic ester monomer which contains a quaternary ammonium base; (meth)acrylamidopropyltrimethyl ammonium chloride, (meth)acrylamidopropyldimethylbenzyl ammonium chloride, or other (meth)acrylamide monomer which contains a quaternary ammonium base; etc. may be mentioned.

As specific examples of monomer able to form cations, 2-vinylpyridine, 4-vinylpyridine, or other cyclic amine monomer which contains a vinyl group; dimethylaminoethyl (meth)acrylate or other (meth)acrylate ester monomer which contains a tertiary amino group; (meth)acrylamide dimethylaminoethyl, N,N-dimethylaminopropyl acrylamide, or other (meth)acrylamide monomer which contains a tertiary amino group; N-(4-anilinophenyl)acrylamide, N-(4-anilinophenyl)methacrylamide, N-(4-anilinophenyl)cinnamide, N-(4-anilinophenyl)crotonamide, N-phenyl-4-(3-vinylbenzyloxy) aniline N-phenyl-4-(4-vinylbenzyloxy)aniline etc. may be mentioned.

These may be used as single types alone or as a plurality of types combined.

Among the cationic monomers and monomers able to form cations, since the effect of the present invention becomes much more remarkable, a cyclic amine monomer which contains a vinyl group, a (meth)acrylic ester monomer which contains a tertiary amino group, and a (meth)acrylamide monomer which contains a tertiary amino group are preferable, a cyclic amine monomer which contains a vinyl group and an acrylamide monomer which contains a tertiary amino group are more preferable, and a cyclic amine monomer which contains a vinyl group is particularly preferable.

Note that, as a vinyl group-containing cyclic amine monomer, vinyl group-containing pyridines are preferable, while 2-vinylpyridine is particularly preferable.

The ratio of content of the cationic monomer units and/or monomer units able to form cations (a3) is 0 to 30 wt % with respect to the total monomer units, preferably 0.1 to 30 wt %, more preferably 0.3 to 20 wt %, particularly preferably 0.3 to 10 wt %. By including the cationic monomer units and/or monomer units able to form cations (a3) in the above contents, the obtained cross-linked rubber easily becomes excellent in gasoline permeation resistance.

Further, the nitrile copolymer rubber (A) used in the present invention may contain, in addition to the α,β-ethylenically unsaturated nitrile monomer units (a1), conjugated diene monomer units (a2), and cationic monomer units and/or monomer units able to form cations (a3), units of other monomers able to copolymerize with the monomers which form these monomer units. The ratio of content of such other monomer units is preferably 30 wt % or less with respect to the total monomer units, more preferably 20 wt % or less, furthermore preferably 10 wt % or less.

As such other copolymerizable monomers, for example, fluoroethylvinyl ether, fluoropropylvinyl ether, o-(trifluoro) methylstyrene, vinyl pentafluorobenzoate, difluoroethylene, tetrafluoroethylene, and other fluorine-containing vinyl compounds; 1,4-pentadiene, 1,4-hexadiene, vinylnorbornene, dicyclopentadiene, and other nonconjugated diene compounds; ethylene; propylene, 1-butene, 4-methyl-1-pentene, 1-hexene, 1-octene, and other α-olefin compounds; acrylic acid, methacrylic acid, and other α,β-ethylenically unsaturated monovalent carboxylic acids; maleic acid, maleic acid anhydride, itaconic acid, itaconic anhydride, fumaric acid, maleic acid anhydride, and other α,β-ethylenically unsaturated polyvalent carboxylic acids and their anhydrides; methyl(meth)acrylate, ethyl(meth)acrylate, butyl(meth)acrylate, 2-ethylhexyl(meth)acrylate, and other α,β-ethylenically unsaturated carboxylic acid alkyl esters; monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, dibutyl itaconate, and other monoesters and diesters of α,β-ethylenically unsaturated polyvalent carboxylic acids; methoxyethyl (meth)acrylate, methoxypropyl(meth)acrylate, butoxyethyl (meth)acrylate, and other alkoxyl alkylesters of α,β-ethylenically unsaturated carboxylic acids; 2-hydroxyethyl(meth) acrylate, 3-hydroxypropyl(meth)acrylate, and other hydroxy alkylesters of α,β-ethylenically unsaturated carboxylic acids; divinylbenzene and other divinyl compounds; ethylene di(meth)acrylate, diethyleneglycol di(meth)acrylate, ethyleneglycol di(meth)acrylate, and other di(meth)acrylate esters; trimethylolpropane tri(meth)acrylate and other tri (meth)acrylic acid esters; and other polyfunctional ethylenically unsaturated monomers and also N-methylol(meth) acrylamide, N,N'-dimethylol (meth)acrylamide, and other self cross-linkable compounds; etc. may be mentioned.

The nitrile copolymer rubber used in the present invention has a Mooney viscosity (below, sometimes referred to as a "polymer Mooney viscosity") ($ML_{1+4}$, 100° C.) of preferably 3 to 250, more preferably 15 to 180, furthermore preferably 20 to 160. If the nitrile copolymer rubber is too low in polymer Mooney viscosity, the obtained cross-linked rubber is liable to drop in strength characteristics. On the other hand, if too high, the workability may deteriorate.

The nitrile copolymer rubber used in the present invention can be produced by copolymerizing the monomers which form the above nitrile copolymer rubber. The method of copolymerizing the monomers is not particularly limited, but for example the emulsion polymerization method of using sodium dodecylbenzene sulfonate or another emulsifier to obtain a latex of a copolymer having an about 50 to 1,000 nm average particle size, the suspension polymerization method of using polyvinyl alcohol or another dispersant to obtain an aqueous dispersion of a copolymer having an about 0.2 to 200 μm average particle size (including also microsuspension polymerization method), etc. may be suitably used. Among these as well, due to the ease of control of the polymerization reaction, the emulsion polymerization method is more preferable.

The emulsion polymerization method is preferably performed by the following procedure.

Note that, below, suitably, the α,β-ethylenically unsaturated nitrile monomer is referred to as the "monomer (m1)", the conjugated diene monomer is referred to as the "monomer (m2)", and the monomer which forms the cationic monomer units and/or monomer units able to form cations are referred to as the "monomer (m3)".

That is, the method of polymerizing a monomer mixture comprising the monomer (m1) in 15 to 85 wt %, preferably 30 to 75 wt %, more preferably 40 to 70 wt %, the monomer (m2) in 15 to 85 wt %, preferably 24.9 to 69.9 wt %, more preferably 29.7 to 59.7 wt %, and the monomer (m3) in 0 to 40 wt %, preferably 0.1 to 20 wt %, more preferably 0.3 to 10 wt % (where, the total of the monomer (m1), monomer (m2), and monomer (m3) being 100 wt %) by emulsion polymerization, stopping the polymerization reaction when the polymerization conversion rate is preferably 50 to 95 wt %, then if desired removing the unreacted monomers is preferable.

If the amount of use of the monomer (m1) used for the emulsion polymerization method is too small, the obtained cross-linked rubber deteriorates in oil resistance and deteriorates in gasoline permeation resistance. On the other hand, if the amount of use of the monomer (m1) is too large, the cold resistance tends to deteriorate. If the amount of use of the monomer (m2) is too small, the obtained cross-linked rubber deteriorates in cold resistance, while if the amount of use of the monomer (m2) is too large, the obtained cross-linked rubber tends to deteriorate in gasoline permeation resistance. Further, by using the monomer (m3) in the above range, the obtained cross-linked rubber can be further improved in gasoline permeation resistance.

Note that, if the polymerization conversion rate for stopping the polymerization reaction is too low, recovery of the unreacted monomers becomes extremely difficult. On the other hand, if too high, the obtained cross-linked rubber deteriorates in normal physical properties.

At the time of emulsion polymerization, it is possible to suitably use emulsifiers, polymerization initiators, polymerization secondary materials, etc. which are conventionally known in the field of emulsion polymerization. The polymerization temperature and polymerization time also may be suitably adjusted.

Further, it is possible to use the entire amounts of the monomers (m1) to (m3) which are used for the emulsion polymerization so as to start the polymerization reaction, but from the viewpoint of controlling the distribution of composition of the monomer units of the copolymer which is produced and obtaining cross-linked rubber which is richer in rubbery elasticity, it is preferable to use parts of the entire amounts of the monomers (m1) to (m3) which are used for the emulsion polymerization to start the polymerization reaction, then add the remains of the monomers (m1) to (m3) which are used for the emulsion polymerization at a stage in the middle of the reaction to the reaction vessel to continue the polymerization reaction. This is because if making the entire amounts of the monomers (m1) to (m3) which are used for the emulsion polymerization react from the start of the polymerization reaction, the distribution of composition of the copolymer ends up becoming broader.

In this case, it is preferable to charge, into the reaction vessel, a monomer mixture which is comprised of preferably 10 to 100 wt %, more preferably 20 to 100 wt %, particularly preferably 30 to 100 wt % of the monomer (m1) which is used for the polymerization, preferably 5 to 90 wt %, more preferably 10 to 80 wt %, particularly preferably 15 to 70 wt % of the monomer (m2) which is used for the polymerization, and preferably 0 to 100 wt %, more preferably 30 to 100 wt %, particularly preferably 70 to 100 wt % of the monomer (m3) which is used for the polymerization, to start the polymerization reaction, then, when the polymerization conversion rate of the monomer mixture which is charged into the reaction vessel is preferably 5 to 80 wt %, add the remaining monomers to the reaction vessel to continue the polymerization reaction. Note that, even when not using the monomer (m3), it is preferable to use the above amounts of the monomer (m1) and monomer (m2) which are used for the polymerization to start the polymerization reaction and to add to the reaction vessel the remains of the monomer (m1) and monomer (m2) at the above range of polymerization conversion rate.

The method of adding the remaining monomers is not particularly limited. They may be added all together, may be added divided into batches, or may be continuously added. In the present invention, from the viewpoint of the greater ease of control of the distribution of composition of the obtained copolymer, it is preferable to add the remaining monomers divided into batches. Addition divided into one to six batches is particularly preferable. When adding the remaining monomers divided into batches, the amounts of the monomers to be added divided into batches and the timings of addition divided into batches may be adjusted so as to match with the progress of the polymerization reaction and so that the desired nitrile copolymer rubber is obtained.

Further, after this, as desired, heat distillation, vacuum distillation, steam distillation, or another known method may be used to remove the unreacted monomers whereby a latex of the nitrile copolymer rubber (A) can be obtained.

Next, the obtained latex of the nitrile copolymer rubber (A) is coagulated and if necessary rinsed and dried to obtain the nitrile copolymer rubber (A). The coagulation of the latex of the nitrile copolymer rubber (A) is not particularly limited, but coagulation by freezing, coagulation by drying, coagulation by a water-soluble organic liquid, coagulation by salting out, or other known method can be used. As the coagulant, calcium chloride, sodium chloride, calcium hydroxide, aluminum sulfate, aluminum hydroxide, etc. may be mentioned. Further, the amount of use of the coagulant is preferably 0.5 to 30 wt % with respect to the nitrile copolymer rubber (A), particularly preferably 0.5 to 20 wt %.

Note that, the nitrile copolymer rubber (A) used in the present invention may be hydrogenated nitrile copolymer rubber comprised of a copolymer which is obtained by copolymerization in the above way wherein at least part of the carbon-carbon unsaturated bond parts in the conjugated diene monomer unit part is hydrogenated (hydrogen addition reaction). The method of hydrogenation is not particularly limited. Any known method may be employed. When making the nitrile copolymer rubber (A) a hydrogenated nitrile copolymer rubber, its iodine value is preferably 0 to 70 in range, more preferably 4 to 60 in range. By hydrogenating the nitrile copolymer rubber and making it a hydrogenated nitrile copolymer rubber, it is possible to improve the heat resistance, weather resistance, ozone resistance, etc.

Flat Cellulose Particles (B)

The flat cellulose particles (B) used in the present invention are flat cellulose with an aspect ratio of 30 to 600. In the present invention, by mixing the flat cellulose particles (B) into the above-mentioned nitrile copolymer rubber (A), it is possible to make the obtained cross-linked rubber excellent in gasoline permeation resistance and tensile strength. In particular, in the present invention, when mixing the flat cellulose particles (B) into the nitrile copolymer rubber (A), even when mixing these in the dry state, it is possible to make the flat cellulose particles (B) disperse well into the nitrile copolymer rubber (A), so it is possible to obtain cross-linked rubber in which the gasoline permeation resistance and tensile strength are suitably raised.

The flat cellulose particles (B) used in the present invention need only be flat shaped particles with an aspect ratio of 30 to 600 in range and mainly comprised of cellulose, but for example may be ones which are produced by the following method. That is, as the flat cellulose particles (B), it is possible to use ones which are produced by using as materials wood or cotton, recycled cellulose fibers, or other cellulosic substances, adding and mixing synthetic polymers, fatty acids, water, organic solvents, N-acylamino acids, or other additives to the cellulosic substances, then mechanically crushing the obtained mixture, and removing the added ingredients after crushing.

Note that, the cellulosic substances used as the materials usually have 3 to 10 wt % or so adsorbed moisture, so when producing the flat cellulose particles (B), it is preferable to dry in advance the materials to a moisture content of preferably 1 wt % or less, more preferably 0.1 wt % or less, use the dried cellulosic substances, and then mix in the synthetic polymers, fatty acids, water, organic solvents, N-acylamino acids, or other additives.

As the synthetic polymers, polyvinyl alcohol and other polyalcohols, polyethyleneglycol and Other polyethers, polyethylene and other polyolefins, polyimide, etc. may be used. As the fatty acids, stearic acid and other saturated fatty acids, derivatives of saturated fatty acids, oleic acid and other unsaturated fatty acids, zinc salts or sodium salts of unsaturated fatty acids and other salts of unsaturated fatty acids, derivatives of unsaturated fatty acids, etc. may be mentioned.

Further, as the crushing apparatus which is used when crushing the mixture which is obtained by adding and mixing various ingredients to the cellulosic substance, for example, a vibrating ball mill, rotary ball mill, planetary type ball mill, roll mill, disk mill, high speed mixer using high speed rotating blades, homomixer, etc. may be used.

The flat cellulose particles (B) need only be ones with a aspect ratio of 30 to 600 in range, but ones with an aspect ratio of 50 to 500 in range are preferable and ones with an aspect ratio of 100 to 400 in range are more preferable. If the flat cellulose particles (B) are too small in aspect ratio, the obtained cross-linked rubber ends up deteriorating in gasoline permeation resistance. On the other hand, if they are too large in aspect ratio, dispersion into the nitrile copolymer rubber (A) becomes difficult and the obtained cross-linked rubber ends up falling in tensile strength and other mechanical strength.

The aspect ratio of the flat cellulose particles (B) can be calculated by finding the ratio of the surface average diameter and average thickness of the primary particles of the flat cellulose particles (B). Here, the surface average diameter and the average thickness are number average values which are obtained by measuring the diameters in the surface direction and thicknesses of 100 flat cellulose particles (B) which are randomly selected by an atomic force microscope and calculating the arithmetic averages.

The volume average particle size of the flat cellulose particles (B) which is measured by a laser diffraction/scattering particle size analyzer is preferably 0.05 to 100 μm, more preferably 0.1 to 75 μm, furthermore preferably 0.5 to 50 μm.

In the nitrile copolymer rubber composition of the present invention, the content of the flat cellulose particles (B) is 1 to 200 parts by weight with respect to 100 parts by weight of the nitrile copolymer rubber (A), preferably 1 to 100 parts by weight, more preferably 2 to 50 parts by weight. If the content of the flat cellulose particles (B) is too small, the effect of addition of the flat cellulose particles (B) tends to become hard to obtain. On the other hand, if the content is too large, the obtained cross-linked rubber is liable to fall in elongation.

Vinyl Chloride Resin and/or Acrylic Resin

Further, the nitrile copolymer rubber composition of the present invention may further contain a vinyl chloride resin and/or acrylic resin in addition to the above-mentioned nitrile copolymer rubber (A) and flat cellulose particles (B). By Making the nitrile copolymer rubber composition of the present invention further contain a vinyl chloride resin and/or acrylic resin, preferably a vinyl chloride resin, the obtained cross-linked rubber can be improved in ozone resistance.

The vinyl chloride resin has a main constituent monomer constituted by vinyl chloride. The content of the units of the main constituent monomer is preferably 50 to 100 wt %, more preferably 60 to 100 wt %, furthermore preferably 70 to 100 wt %. The vinyl chloride resin has an average polymerization degree based on the solution viscosity method prescribed in JIS K6721 of preferably 400 to 3,000, more preferably 600 to 2,000, and has a glass transition temperature (Tg) of preferably 50 to 180° C.

The vinyl chloride resin can be produced by the conventionally known emulsion polymerization or suspension polymerization.

For example, when producing it by emulsion polymerization, a pressure resistant reaction vessel is charged with water, sodium laurosulfate or other emulsifier, and potassium persulfate or other polymerization initiator, is repeatedly reduced in pressure and degassed, then is charged with the vinyl chloride monomer (with another monomer able to copolymerize with it able to be added as required), the mixture is warmed while stirring it to perform emulsion polymerization, a polymerization terminator is added when the polymerization conversion rate reaches a predetermined value, then the solution is cooled to room temperature and the unreacted monomers is removed to obtain the vinyl chloride resin latex. Next, the obtained vinyl chloride resin latex is coagulated and if necessary rinsed and dried in the same way as the case of the above nitrile copolymer rubber (A) latex to obtain the vinyl chloride resin.

An acrylic resin is a resin where the main constituent monomer is an (meth)acrylic acid alkyl ester. The content of the units of the main constituent monomer is preferably 50 to 100 wt %, more preferably 60 to 100 wt %, furthermore preferably 70 to 100 wt %. Further, an acrylic resin has a number average molecular weight (Mn) by gel permeation chromatography (GPC) converted to standard polystyrene of preferably 10,000 to 7,000,000, more preferably 100,000 to 2,000,000, and a glass transition temperature (Tg) of preferably 60 to 150° C.

The acrylic resin can be produced by the conventionally known emulsion polymerization or suspension polymerization.

For example, when producing it by emulsion polymerization, a reaction vessel is charged with water, sodium octylsulfate or other emulsifier, ammonium persulfate or other polymerization initiator, methyl methacrylate or other monomer (with another monomer able to copolymerize with it able to be added as required), the mixture can be warmed while stirring it to perform emulsion polymerization, a polymerization terminator is added when the polymerization conversion rate reaches a predetermined value, then the solution is cooled to room temperature and the unreacted monomers is removed to obtain the acrylic resin latex. Next, the obtained acrylic resin latex is coagulated and if necessary rinsed and dried in the same way as the case of the above nitrile copolymer rubber (A) latex to obtain the acrylic resin.

In the nitrile copolymer rubber composition of the present invention, the content of the vinyl chloride resin and/or acrylic resin is preferably 10 to 150 parts by weight with respect to 100 parts by weight of the nitrile copolymer rubber (A), more preferably 15 to 130 parts by weight, furthermore preferably 20 to 100 parts by weight. If the content of the vinyl chloride resin and/or acrylic resin is too small, the gasoline permeation resistance and ozone resistance are liable to become inferior, while if the content is too large, the cold resistance is liable to deteriorate.

Other Ingredients

Further, the nitrile copolymer rubber composition of the present invention may contain a layered inorganic filler or plasticizer in addition to the above ingredients.

The layered inorganic filler need only be one which has a layered structure, but one with an aspect ratio of 30 to 2000 is preferable, more preferably one with an aspect ratio of 40 to 1000, furthermore preferably one with an aspect ratio of 50 to 500. By mixing in the layered inorganic filler, the obtained cross-linked rubber can be improved in gasoline permeation resistance. Note that, the aspect ratio of the layered inorganic filler can, for example, be found in the same way as the above-mentioned flat cellulose particles (B).

Further, the layered inorganic filler has a volume average particle size measured by a laser diffraction/scattering particle size analyzer of preferably 0.1 to 80 µm, more preferably 0.1 to 60 µm, furthermore preferably 0.1 to 40 µm.

The layered inorganic filler is not particularly limited. It may be one derived from a natural material, may be a natural material which is refined or otherwise treated, or may be a synthetic material. As specific examples, kaolinite, halloysite, and other kaolinites; montmorillonite, beidelite, nontronite, saponite, hectorite, stevensite, mica and other smectites; and vermiculites; chlorites; talc; E glass or C glass or other amorphous plate shaped particles constituting glass flakes etc. may be mentioned. Among these as well, smectites are preferable, while montmorillonite, mica, and saponite are more and montmorillonite is particularly preferable. These may be used as single type alone or as a plurality of types together. Note that, montmorillonite, mica, and saponite are multilayer structures which have exchangeable positive ions between layers, so if the above nitrile copolymer rubber has cationic monomer units, the dispersibility into the nitrile copolymer rubber is good.

Here, among the above, montmorillonite is contained as the main ingredient in bentonite. For this reason, as the montmorillonite, it is possible to use one obtained by refining bentonite.

In the nitrile copolymer rubber composition of the present invention, the content of the layered inorganic filler is preferably 0 to 100 parts by weight with respect to 100 parts by weight of the nitrile copolymer rubber (A), more preferably 0 to 50 parts by weight, furthermore preferably 0 to 30 parts by weight. If the content of the layered inorganic filler is too large, the obtained cross-linked rubber is liable to fall in elongation.

Further, the plasticizer is not particularly limited, but since the obtained cross-linked rubber becomes excellent in gasoline permeation resistance and cold resistance and since the embrittlement temperature falls (cold resistance is improved), a plasticizer with an SP value (solubility parameter) by the HOY method of 8 to 10.2 $(cal/cm^3)^{1/2}$ is preferable.

As specific examples of such a plasticizer (units of SP value are "$(cal/cm^3)^{1/2}$"), for example, dibutoxyethyl adipate (SP value: 8.8), di(butoxyethoxyethyl)adipate (SP value: 9.2), di(methoxytetraethyleneglycol)adipate, di(methoxypentaethyleneglycol) adipate, (methoxytetraethyleneglycol)(methoxypentaethyleneglycol) adipate, di(methoxytriethoxyethyl)adipate, (methoxytriethoxyethyl)(methoxytetraethoxyethyl)adipate, di(methoxytetraethoxyethyl)adipate, (butoxytriethoxyethyl)(pentoxytetraethoxyethyl)adipate, (pentoxytriethoxyethyl) (pentoxytetraethoxyethyl)adipate, and other ester compounds of adipic acid and ether bond-containing alcohols; dibutoxyethyl azelate, di(butoxyethoxyethyl)azelate, and other ester compounds of azelaic acid and ether bond-containing alcohols; dibutoxyethyl sebacate, di(butoxyethoxyethyl)sebacate, and other ester compounds of sebacic acid and ether bond-containing alcohols; dibutoxyethyl phthalate, di(butoxyethoxyethyl) phthalate, and other ester compounds of phthalic acid and ether bond-containing alcohols; dibutoxyethyl isophthalate, di(butoxyethoxyethyl)isophthalate, and other ester compounds of isophthalic acid and ether bond-containing alcohols; di-(2-ethylhexyl)adipate (SP value: 8.5), diisodecyl adipate (SP value: 8.3), diisononyl adipate, dibutyl adipate (SP value: 8.9), and other adipic acid dialkyl esters; di-(2-ethylhexyl)azelate (SP value: 8.5), diisooctyl azelate, di-n-hexyl azelate, and other azelaic acid dialkyl esters; di-n-butyl sebacate (SP value: 8.7), di-(2-ethylhexyl)sebacate (SP value: 8.4), and other sebacic acid dialkyl esters; dibutyl phthalate (SP value: 9.4), di-(2-ethylhexyl) phthalate (SP value: 9.0), di-n-octyl phthalate, diisobutyl phthalate, diheptyl phthalate (SP value: 9.0), diisodecyl phthalate (SP value: 8.5), diundecyl phthalate (SP value: 8.5), diisononyl phthalate (SP value: 8.9), and other phthalic acid dialkyl esters; dicyclohexyl phthalate and other phthalic acid dicycloalkyl esters; diphenyl phthalate, butylbenzyl phthalate (SP value: 10.2), and other phthalic acid arylesters; di-(2-ethylhexyl) isophthalate, diisooctyl isophthalate, and other isophthalic acid dialkyl esters; di-(2-ethylhexyl)tetrahydrophthalate, di-n-octyl tetrahydrophthalate, diisodecyl tetrahydrophthalate, and other tetrahydrophthalic acid dialkyl esters; tri-(2-ethylhexyl)trimellitate (SP value: 8.9), tri-n-octyl trimellitate (SP value: 8.9), triisodecyl trimellitate (SP value: 8.4), triisooctyl trimellitate, tri-n-hexyl trimellitate, triisononyl trimellitate (SP value: 8.8), triisodecyl trimellitate (SP value: 8.8), and other trimellitic acid derivatives; epoxylated soybean oil (SP value: 9.0), epoxylated linseed (SP value: 9.3), and other epoxy-based plasticizers; tricresyl phosphate (SP value: 9.7), and other phosphoric acid ester-based plasticizers; etc. may be mentioned. These may be used as single types alone or as a plurality of types combined.

Among these as well, the obtained cross-linked rubber can be made much better in gasoline permeation resistance and cold resistance, so ester compound of adipic acid, azelaic acid, sebacic acid, phthalic acid, and other dibasic acids and ether bond-containing alcohols are preferable, ester compounds of adipic acid and ether bond-containing alcohols are more preferable, and di(butoxyethoxyethyl) adipate is particularly preferable.

In the nitrile copolymer rubber composition of the present invention, the content of the plasticizer is preferably 0.1 to 200 parts by weight with respect to 100 parts by weight of the nitrile copolymer rubber (A), more preferably 5 to 150 parts by weight, furthermore preferably 5 to 70 parts by weight. If the amount of the plasticizer used is in the above range, bleeding can be prevented and also the effect of the present invention becomes much more remarkable.

Method of Preparation of Nitrile Copolymer Rubber Composition

The nitrile copolymer rubber composition of the present invention can be produced by mixing in a dry state the nitrile copolymer rubber (A), flat cellulose particles (B), and ingredients which are added according to need. The method of mixing these ingredients in the dry state is not particularly limited, but the method of mixing these ingredients by rolls or a Bambury mixer or other mixing machine may be mentioned. The mixing temperature is preferably 30 to 200° C., more preferably 40 to 170° C. Further, the mixing time is preferably 1 to 60 minutes, more preferably 5 to 30 minutes.

Note that, in the present invention, when preparing the nitrile copolymer rubber composition, the ingredients which form the nitrile copolymer rubber composition are mixed in the dry state, but in this case, it is sufficient to mix them in a state which can substantially be said to be the "dry state". For example, if very small an amount, water or an organic solvent or other volatile ingredient etc. may also be included.

In particular, according to the present invention, as the filler which is mixed into the nitrile copolymer rubber (A), flat cellulose particles (B) are used, so production by mixing in the dry state as explained above is possible. Further, even when mixing in the dry state for production, cross-linked rubber which is excellent in gasoline permeation resistance and tensile strength can be obtained. That is, in the present invention, by using as a filler the flat cellulose particles (B), there is no need for mixing in the state of an aqueous dispersion. Therefore, it is possible to eliminate the steps which are required in mixing in the state of an aqueous dispersion and possible to simplify the production process.

Cross-Linkable Nitrile Copolymer Rubber Composition

The cross-linkable nitrile copolymer rubber composition of the present invention is comprised of the above-mentioned nitrile copolymer rubber composition of the present invention to which a cross-linking agent is added.

The cross-linking agent may be any one which is usually used as a cross-linking agent of a nitrile copolymer rubber (A) and is not particularly limited. As typical cross-linking agents, a sulfur-based cross-linking agent or organic peroxide cross-linking agent which cross-links the unsaturated bonds of the nitrile copolymer rubber (A) may be mentioned. These may be used as single type alone or as a plurality of types together. Among these as well, a sulfur-based cross-linking agent is preferable.

As the sulfur-based cross-linking agent, powdered sulfur, flowers of sulfur, precipitated sulfur, colloidal sulfur, surface-treated sulfur, insoluble sulfur, and other sulfur; sulfur chloride, sulfur dichloride, morpholin disulfide, alkylphenol disulfide, dibenzothiazyl disulfide, N,N'-dithio-bis(hexahydro-2H-azenopin-2), phosphorus-containing polysulfide, high molecular weight polysulfide, and other sulfur-containing compounds; tetramethylthiuram disulfide, selenium dimethyldithiocarbamate, 2-(4'-morpholinodithio)benzothiazole, and other sulfur-donor compounds; etc. may be mentioned. These may be used as single type alone or as several types together.

As the organic peroxide cross-linking agent, dicumyl peroxide, cumen hydroperoxide, t-butylcumyl peroxide, p-menthane hydroperoxide, di-t-butylperoxide, 1,3-bis(t-butylperoxyisopropyl)benzene, 1,4-bis(t-butylperoxyisopropyl)benzene, 1,1-di-t-butylperoxy-3,3-trimethylcyclohexane, 4,4-bis-(t-butyl-peroxy)-n-butyl valerate, 2,5-dimethyl-2,5-di-t-butylperoxyhexane, 2,5-dimethyl-2,5-di-t-butylperoxyhexine-3,1,1-di-t-butylperoxy-3,5,5- trimethylcyclohexane, p-chlorobenzoyl peroxide, t-butylperoxyisopropyl carbonate, t-butylperoxy benzoate, etc. may be mentioned. These may be used as single type alone or as a plurality of types together.

In the cross-linkable nitrile copolymer rubber composition of the present invention, the content of the cross-linking agent is not particularly limited, but is preferably 0.1 to 10 parts by weight with respect to 100 parts by weight of the nitrile copolymer rubber (A), more preferably 0.2 to 5 parts by weight.

When using the sulfur-based cross-linking agent, Zinc White, stearic acid, and other cross-linking aid; guanidine-based, aldehyde-amine-based, aldehyde-ammonia-based, thiazole-based, sulfenamide-based, thiourea-based, and other cross-linking accelerators; may be jointly used. The amount of use of these cross-linking aid and cross-linking accelerator is not particularly limited, but is preferably 0.1 to 10 parts by weight in range with respect to 100 parts by weight of the nitrile copolymer rubber (A).

When using an organic peroxide cross-linking agent, as the cross-linking aid, trimethylolpropane trimethacrylate, divinylbenzene, ethylene dimethacrylate, triallyl isocyanulate, and other polyfunctional monomers etc. may be jointly used. The amount of use of these cross-linking aids is not particularly limited, but is preferably 0.5 to 20 parts by weight in range with respect to 100 parts by weight of the nitrile copolymer rubber (A).

Further, the nitrile copolymer rubber composition or cross-linkable nitrile copolymer rubber composition of the present invention may also contain other compounding agents which are used in general rubber in accordance with need, for example, cross-linking retardants, antiaging agents, fillers other than the flat cellulose particles (B) and layered inorganic filler, slip agents, tackifiers, lubricants, processing aids, flame retardants, anti-mold agents, anti-static agents, coloring agents, coupling agent, and other additives.

As an antiaging agent, a phenol-based, amine-based, benzimidazole-based, phosphoric acid-based, or other anti-aging agent may be used. As a phenol-based one, 2,2'-methylene bis(4-methyl-6-t-butylphenol) etc. may be mentioned, as an amine-based one, 4,4'-bis($\alpha,\alpha$-dimethylbenzyl) diphenylamine, N-isopropyl-N'-phenyl-p-phenylene diamine, etc. may be mentioned, while as a benzimidazole-based one, 2-mercaptobenzimidazole etc. may be mentioned. These may be used alone as single type or as two or more types combined.

As the filler other than the flat cellulose particles (B) and layered inorganic filler, for example, carbon black, silica, calcium carbonate, aluminum silicate, magnesium silicate, calcium silicate, magnesium oxide, staple fibers, and zinc (meth)acrylate or magnesium (meth)acrylate and other $\alpha,\beta$-ethylene-based unsaturated carboxylic acid metal salts etc. may be mentioned. These fillers may be treated for coupling by using silane coupling agents, titanium coupling agents, etc. or treated for surface modification by using higher fatty acids or their metal salts, esters or amides or other high fatty acid derivatives or surfactants etc.

Further, the nitrile copolymer rubber composition and cross-linkable nitrile copolymer rubber composition of the present invention may contain, in a range not impairing the advantageous effects of the present invention, another polymer other than the nitrile copolymer rubber (A) and the above-mentioned vinyl chloride resin and acrylic resin. The other polymer is not particularly limited, but fluororubber, styrene-butadiene copolymer rubber, ethylene-propylene copolymer rubber, ethylene-propylene-diene ternary copolymer rubber, natural rubber and polyisoprene rubber, epichlorohydrin rubber, urethane rubber, chloroprene rubber, ethylene-vinyl acetate copolymer, chlorosulfonated polyethylene, etc. may be mentioned. Note that, the amount of mixture when blending in the other polymer is preferably 100 parts by weight or less with respect to 100 parts by weight of the nitrile copolymer rubber (A), more preferably 50 parts by weight or less, particularly preferably 30 parts by weight or less.

The method of preparation of the cross-linkable nitrile copolymer rubber composition of the present invention is not particularly limited, but the method of adding, to the above nitrile copolymer rubber composition, a cross-linking agent, cross-linking aid, and other compounding agents and kneading them by rolls, a Bambury mixer or other mixing machine etc. may be mentioned. Note that, in this case, the order of mixing is not particularly limited, but it is sufficient to sufficiently mix the ingredients which are resistant to reaction or decomposition due to heat, then mix in the ingredients which easily react or the ingredients which easily break down under heat, for example, the cross-linking agent, cross-linking accelerator, etc., at a temperature where such a reaction or decomposition does not occur (usually 30 to 95° C.) in a short time (usually 1 minutes to 10 minutes).

The cross-linkable nitrile copolymer rubber composition of the present invention has a Mooney viscosity ($ML_{1+4}$, 100° C.) of preferably 5 to 300, more preferably 10 to 250.

Cross-Linked Rubber

The cross-linked rubber of the present invention is obtained by cross-linking the above-mentioned cross-linkable nitrile copolymer rubber composition.

When cross-linking the cross-linkable nitrile copolymer rubber composition of the present invention, a shaping machine corresponding to the shape of the shaped article (cross-linked rubber) being produced, for example, an extruder, injection molding machine, compressor, rolls, etc. is used to shape the composition, then a cross-linking reaction is caused to fix the shape of the cross-linked product. When performing the cross-linking, it is possible to cross-link the composition after the preliminary shaping or cross-link it simultaneously with the shaping. The shaping temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 1 hour.

Further, depending on its shape, size, etc., the cross-linked rubber will sometimes not be sufficiently cross-linked up to the inside even if its surface is cross-linked, so it is possible to further heat the product for secondary cross-linking.

The thus obtained cross-linked rubber of the present invention is excellent in oil resistance and tensile strength. Therefore, the cross-linked rubber of the present invention is also suitably used for packings, gaskets, O-rings, oil seals, and other seal members; oil hoses, fuel hoses, inlet hoses, gas hoses, brake hoses, refrigerant hoses, and other hoses; diaphragms; accumulator bladders; boots; etc., but is particularly suitably used for hoses, seals, packings, and gaskets.

Among these, the cross-linked rubber of the present invention is suitably used as a fuel hose etc. using a layer comprised of the cross-linked rubber of the present invention for at least one layer of a hose comprised of one layer or two layers or more. At this time, in the case of a two-layer or more laminate, the layer which is comprised of the cross-linked rubber of the present invention may be used for either the inside layer, intermediate layer, and outside layer. As the other layers of the laminate, nitrile rubber with a content of trimethylcyclohexane, α,β-ethylenically unsaturated nitrile monomer units of preferably 5 to 35 wt %, more preferably 18 to 30 wt % and also rubber which contains that nitrile rubber and a vinyl chloride resin or acrylic resin or a fluororubber, chloroprene rubber, hydrin rubber, chlorosulfonated polyethylene rubber, acrylic rubber, ethylene-acrylic acid copolymer, ethylene-propylene copolymer, ethylene-propylene-diene ternary copolymer, butyl rubber, isoprene rubber, natural rubber, styrene-butadiene copolymer, fluororesin, polyamide resin, polyvinyl alcohol, ethylene-vinyl acetate copolymer resin, ethylene-vinyl alcohol copolymer resin, polybutylene naphthalate, polyphenylene sulfide, polyolefin resin, polyester resin, etc. may be mentioned. These may be used as single types alone or as a plurality of types combined.

Further, in accordance with need, to bond a layer which is comprised of the cross-linked rubber of the present invention and another layer, it is possible to include tetrabutylphosphonium benzotriazolate, tetraoctylphosphonium benzotriazolate, methyltrioctylphosphonium benzotriazolate, tetrabutylphosphonium tolyltriazolate, tetraoctylphosphonium tolyltriazolate, and other phosphonium salts, 1,8-diazabicyclo(5.4.0)undecene-7 salt (DBU salt), 1,5-diazabicyclo(4.3.0)-nonene-5 salt (DBN salt), etc. in one or both of the layer which is comprised of the cross-linked rubber of the present invention and another layer.

The method of production when making the cross-linked rubber of the present invention into a hose which has such a configuration is not particularly limited, but the method of using an extruder etc. to form a tubular shape and cross-linking the same etc. may be mentioned.

EXAMPLES

Below, examples and comparative examples will be given to explain the present invention more specifically, but the present invention is not limited to these examples. Below, unless especially indicated, "parts" are based on weight. The methods of testing and evaluation of the physical properties and characteristics are as follows.

Mooney Viscosity

The Mooney viscosity (polymer Mooney viscosity) (ML$_{1+4}$, 100° C.) of the nitrile copolymer rubber was measured in accordance with JIS K6300.

Normal Physical Properties (Tensile Strength, Elongation, 100% Tensile Stress, 200% Tensile Stress, 300% Tensile Stress, and Hardness)

The cross-linkable nitrile rubber composition was placed in a mold of a vertical 15 cm, horizontal 15 cm, and depth 0.2 cm and press-formed at 160° C. for 20 minutes while applying 10 MPa pressure to obtain sheet-shaped cross-linked rubber. The obtained sheet-shaped cross-linked rubber was punched by a JIS No. 3 type dumbbell die to prepare test pieces, then these were used to measure the cross-linked rubber for tensile strength, elongation, 100% tensile stress, 200% tensile stress, and 300% tensile stress in accordance with JIS K6251. Further, in accordance with JIS K6253, a Durometer Hardness Tester Type A was used to measure the hardness of the cross-linked rubber.

Gasoline Permeation Coefficient

Sheet-shaped cross-linked rubber similar to the one used for evaluation of the above normal physical properties was prepared, "a mixture of isoctane, toluene, and ethanol in a weight ratio of 2:2:1" as fuel oil was used, and the aluminum cup method was employed to measure the gasoline permeation coefficient. Specifically, a 100 ml capacity aluminum cup was filled with the above fuel oil to 50 ml, the sheet-shaped cross-linked rubber was placed over it to cap it, then fasteners were used to adjust the area by which the sheet-shaped cross-linked rubber separated the inside and outside of the aluminum cup to 25.50 cm$^2$, the aluminum cup was allowed to stand in a 23° C. constant temperature tank, then the weight was measured every 24 hours to thereby measure the amount of permeation of the oil every 24 hours. The maximum amount was defined the amount of permeation (unit: g·mm/m$^2$·day).

Note that, the lower the gasoline permeation coefficient, the better the gasoline permeation resistance can be evaluated and the more preferable.

Production Example 1: Production of Nitrile Copolymer Rubber (A1)

To a reaction vessel, water 240 parts, acrylonitrile 75.7 parts, and sodium dodecylbenzene sulfonate (emulsifier) 2.5 parts were charged and the temperature adjusted to 5° C. Next, the vapor phase was reduced in pressure and sufficiently removed, then 1,3-butadiene 22 parts, a polymerization initiator of p-menthane hydroperoxide 0.06 part, sodium ethylene diamine tetraacetate 0.02 part, ferrous sulfate (7-hydrate) 0.006 part, and sodium formaldehyde sulfoxylate 0.06 part, and a chain transfer agent of t-dodecyl mercaptan 1 part were added to start a first stage of emulsion polymerization. After the start of the reaction, when the polymerization conversion rate of the charged monomers reached 42 wt % and 60 wt %, the reaction vessel was additionally charged with 1,3-butadiene respectively in 12 parts and 12 parts for a second stage and a third stage of polymerization reaction. After that, when the polymerization conversion rate of the total charged monomers reached 75 wt %, hydroxylamine sulfate 0.3 part and potassium hydroxide 0.2 part were added to make the polymerization reaction stop. After stopping the reaction, the content of the reaction vessel was warmed to 70° C. and steam distillation was used under reduced pressure to recover the unreacted monomers to obtain a latex of the nitrile copolymer rubber (A1) (solid content: 24 wt %), Next, the obtained latex of nitrile copolymer rubber (A1) was poured into an aqueous solution containing calcium chloride (coagulant) in an amount of 4 wt % with respect to the solid content (amount of nitrile copolymer rubber) while stirring so as to cause the polymer to coagulate. Further, the result was filtered to recover the crumbs, the crumbs were then rinsed and were dried in vacuo at 60° C. to obtain the nitrile copolymer rubber (A1). The ratios of content of the monomer units which form the obtained nitrile copolymer rubber (A1) were measured by $^1$H-NMR using an FT-NMR apparatus (product name "AVANCEIII500", made by Bruker Biospin), whereupon the ratios were acrylonitrile units 50 wt % and 1,3-butadiene units 50 wt %. Further, the nitrile copolymer rubber (A1) had a Mooney viscosity (polymer Mooney viscosity) of 75.

Production Example 2: Production of Nitrile Copolymer Rubber (A2)

Except for further using 2-vinylpyridine 2.2 parts as a charged monomer of the first stage reaction of the emulsion polymerization in addition to acrylonitrile 75.7 parts and 1,3-butadiene 22 parts in Production Example 1, the same procedure was followed as in Production Example 1 to obtain the nitrile copolymer rubber (A2). The ratios of content of the monomer units which form the obtained nitrile copolymer rubber (A2) were measured in the same way as in Production Example 1, whereupon the ratios were acrylonitrile monomer units 50 wt % 2-vinylpyridine units 2 wt %, and 1,3-butadiene units 48 wt %. Further, the nitrile copolymer rubber (A2) had a Mooney viscosity (polymer Mooney viscosity) of 73.

Production Example 3: Production of Latex of Hydrogenated Nitrile Copolymer Rubber (A3)

Except for adding to the reaction vessel a palladium catalyst (solution of 1 wt % palladium acetate acetone solution and equal weight of ion exchanged water mixed together) so that the palladium content with respect to the dry weight of the rubber which is contained in the latex becomes 1000 ppm for the latex of the nitrile copolymer rubber (A2) which was obtained in Production Example 2, performing a hydrogen addition reaction at a hydrogen pressure of 3 MPa and a temperature of 50° C. for 6 hours so as to obtain a latex of hydrogenated nitrile copolymer rubber (A3), the same procedure was followed as in Production Example 2 to obtain the hydrogenated nitrile copolymer rubber (A3). The ratios of content of the monomer units which form the obtained hydrogenated nitrile copolymer rubber (A3) were measured in the same way as in Production Example 1, whereupon they were acrylonitrile monomer units 50 wt %, 2-vinylpyridine units 2 wt %, total of 1,3-butadiene units and saturated butadiene units 48 wt %. Further, the hydrogenated nitrile copolymer rubber (A3) had a Mooney viscosity (polymer Mooney viscosity) of 163 and an iodine value of 30.

Production Example 4: Production of Flat Cellulose Particles (B1) and Flat Cellulose Particles (B2)

Cellulose powder derived from refined wood pulp (product name "KC Flock W-400G", made by Japan Paper Chemical) was dried at 40° C. under reduced pressure to reduce the moisture content of the cellulose powder to 0.1% or less. Next, an inside volume 1.5 liter ball mill was filled with 100 SUS crushing media with diameter 15 mm. To this, the above vacuum dried cellulose powder 300 g, water 15 g, and N-acylamino acid (Nϵ-lauroyl-L-lysine) 9 g were added. Next, at a temperature 23° C., the ball mill was made to operate at a speed of 100 rpm for 10 minutes, then was made to stop for 15 minutes. This cycle was repeated a plurality of times to obtain the different aspect ratio flat cellulose particles (B1) and flat cellulose particles (B2). Further, these were measured for aspect ratio and volume average particle size, whereupon the flat cellulose particles (B1) had an aspect ratio of 200 and a volume average particle size of 22 μm and, further, the flat cellulose particles (B2) had an aspect ratio of 150 and a volume average particle size of 14 μm. Note that, the aspect ratio was calculated by measuring the surface average diameters and average thicknesses of 100 flat cellulose particles which are randomly selected by an atomic force microscope and finding the ratio of the arithmetic averages. Further, the volume average particle size was measured using a laser diffraction/scattering particle size analyzer.

Example 1

Using a Bambury mixer, 100 parts of the nitrile copolymer rubber (A1) which was obtained in Production Example 1, 10 parts of the aspect ratio 200 flat cellulose particles (B1) which were obtained in Production Example 4, a plasticizer constituted by di(butoxyethoxyethyl)adipate 10 parts, SRF carbon black (product name "Seast S", made by Tokai Carbon) 20 parts, a cross-linking aid constituted by zinc white 5 parts, and stearic acid 1 part were added and mixed at 50° C. Further, this mixture was transferred to rolls and kneaded at 50° C. with the addition of a cross-linking agent constituted by 325 mesh sulfur 0.5 part and tetramethylthiuram disulfide (product name "Noccelar TT", made by Ouchi Shinko Chemical Industrial) 1.5 parts and N-cyclohexyl-2-benzothiazolyl sulfenamide (product name "Noccelar CZ", made by Ouchi Shinko Chemical Industrial, cross-linking accelerator) 1.5 parts to prepare a cross-linkable nitrile copolymer rubber composition.

Further, the cross-linked rubber which was obtained by cross-linking the cross-linkable nitrile copolymer rubber composition was evaluated for normal physical properties (tensile strength, elongation, 100% tensile stress, 200% tensile stress, 300% tensile stress, and hardness) and gasoline permeation coefficient. The results are shown in Table 1.

Example 2

When preparing the cross-linkable nitrile copolymer rubber composition, except for changing the amount of the flat cellulose particles (B1) from 10 parts to 20 parts, the same procedure was followed as in Example 1 to prepare a cross-linkable nitrile copolymer rubber composition and the same procedure was followed to evaluate it. The results are shown in Table 1.

Example 3

When preparing the cross-linkable nitrile copolymer rubber composition, except for using 10 parts of the aspect ratio 150 flat cellulose particles (B2) which were obtained in Production Example 4 instead of 10 parts of flat cellulose particles (B1), the same procedure was followed as in Example 1 to prepare a cross-linkable nitrile copolymer rubber composition and the same procedure was followed to evaluate it. The results are shown in Table 1.

Example 4

When preparing the cross-linkable nitrile copolymer rubber composition, except for changing the amount of the flat cellulose particles (B2) from 10 parts to 20 parts, the same procedure was followed as in Example 3 to prepare a cross-linkable nitrile copolymer rubber composition and the same procedure was followed to evaluate it. The results are shown in Table 1.

Example 5

When preparing the cross-linkable nitrile copolymer rubber composition, except for using 100 parts of the nitrile copolymer rubber (A2) which was obtained in Production Example 2 instead of 100 parts of the nitrile copolymer rubber (A1), the same procedure was followed as in Example 2 to prepare a cross-linkable nitrile copolymer rubber composition and the same procedure was followed to evaluate it. The results are shown in Table 1.

Example 6

Using a Bambury mixer, 100 parts of the nitrile copolymer rubber (A1) which was obtained in Production Example 1, 10 parts of the aspect ratio 200 flat cellulose particles (B1)

which were obtained in Production Example 4, a plasticizer constituted by di(butoxyethoxyethyl)adipate 15 parts, a vinyl chloride resin (product name "Kanevinyl S1007", made by Kaneka, polymerization degree: 720) 45 parts, a stabilizer (product name "Alkamizer 1", made by Kyowa Chemical) 2 parts, SRF carbon black (product name "Seast S", made by Tokai Carbon) 30 parts, a cross-linking aid constituted by zinc white 7 parts, and stearic acid 1.5 parts were added and mixed at 50° C.

Further, this mixture was transferred to rolls and kneaded at 50° C. with the addition of a cross-linking agent constituted by 325 mesh sulfur 0.7 part, tetramethylthiuram disulfide (product name "Noccelar TT", made by Ouchi Shinko Chemical Industrial) 2 parts and N-cyclohexyl-2-benzothiazolyl sulfenamide (product name "Noccelar CZ", made by Ouchi Shinko Chemical Industrial, cross-linking accelerator) 2 parts to prepare a cross-linkable nitrile copolymer rubber composition. The same procedure was followed as in Example 1 to evaluate it. The results are shown in Table 1.

Example 7

When preparing the cross-linkable nitrile copolymer rubber composition, except for using 100 parts of the hydrogenated nitrile copolymer rubber (A3) which was obtained in Production Example 3 instead of 100 parts of the nitrile copolymer rubber (A1), the same procedure was followed as in Example 2 to prepare a cross-linkable nitrile copolymer rubber composition and the same procedure was followed to evaluate it. The results are shown in Table 1.

Comparative Example 1

When preparing the cross-linkable nitrile copolymer rubber composition, except for using a layered inorganic filler constituted by organoclay (product name "Espen W", made by Hojun, aspect ratio: 200) 20 parts instead of the flat cellulose particles (B1) 20 parts, the same procedure was followed as in Example 2 to prepare a cross-linkable nitrile copolymer rubber composition and the same procedure was followed to evaluate it. The results are shown in Table 1.

Comparative Example 2

When preparing the cross-linkable nitrile copolymer rubber composition, except for using a layered inorganic filler constituted by refined montmorillonite (product name "Kunipia F", made by Kunimine Industries, aspect ratio: 300) 20 parts instead of the flat cellulose particles (B1) 20 parts, the same procedure was followed as in Example 2 to prepare a cross-linkable nitrile copolymer rubber composition and the same procedure was followed to evaluate it. The results are shown in Table 1.

TABLE 1

|  |  | Examples | | | | | | | Comp. Ex. | |
|---|---|---|---|---|---|---|---|---|---|---|
|  |  | 1 | 2 | 3 | 4 | 5 | 6 | 7 | 1 | 2 |
| (Hydrogenated) nitrile copolymer rubber |  | (A1) | (A1) | (A1) | (A1) | (A2) | (A1) | (A3) | (A1) | (A1) |
| Acrylonitrile units | (wt %) | 50 | 50 | 50 | 50 | 50 | 50 | 50 | 50 | 50 |
| 1,3-butadiene units *1) | (wt %) | 50 | 50 | 50 | 50 | 48 | 50 | 48 | 50 | 50 |
| 2-vinylpyridine units | (wt %) | — | — | — | — | 2 | — | 2 | — | — |
| Formulation of cross-linkable nitrile copolymer rubber composition (only part described) | | | | | | | | | | |
| (Hydrogenated) nitrile copolymer rubber | (part) | 100 | 100 | 100 | 100 | 100 | 100 | 100 | 100 | 100 |
| Flat cellulose particles (B1) (aspect ratio: 200) | (part) | 10 | 20 | — | — | 20 | 10 | 20 | — | — |
| Flat cellulose particles (B2) (aspect ratio: 150) | (part) | — | — | 10 | 20 | — | — | — | — | — |
| Refined montmorillonite (aspect ratio: 300) | (part) | — | — | — | — | — | — | — | — | 20 |
| Organoclay (aspect ratio: 200) | (part) | — | — | — | — | — | — | — | 20 | — |
| Vinyl chloride resin | (part) | — | — | — | — | — | 45 | — | — | — |
| Blending method |  | dry blend | dry blend | dry blend | dry blend | dry blend | dry blend | dry blend | dry blend | dry blend |
| Tensile strength | (MPa) | 14.0 | 13.3 | 12.4 | 13.2 | 14.2 | 14.4 | 24.8 | 24.6 | 8.62 |
| Elongation | (%) | 490 | 490 | 470 | 480 | 500 | 490 | 370 | 545 | 521 |
| 100% tensile stress | (MPa) | 2.3 | 2.5 | 2.2 | 2.5 | 2.6 | 5.2 | 7 | 5.3 | 2.0 |
| 200% tensile stress | (MPa) | 3.9 | 4.0 | 3.9 | 4.1 | 4.1 | 9.3 | 17.4 | 7.8 | 2.6 |
| 300% tensile stress | (MPa) | 6.3 | 6.2 | 6.3 | 6.3 | 6.3 | 11.9 | 23 | 10.1 | 3.2 |
| Hardness | (Duro-A) | 69 | 74 | 69 | 73 | 74 | 82 | 87 | 84 | 64 |
| Gasoline permeation coefficient | (g · mm/ m$^2$ · day) | 390 | 352 | 399 | 363 | 348 | 350 | 360 | 458 | 371 |

*1) In the case of hydrogenated nitrile copolymer rubber, amount including saturated butadiene units as well.

From Table 1, it can be confirmed that cross-linked rubber which is obtained by cross-linking a nitrile copolymer rubber composition (including a "hydrogenated nitrile copolymer rubber composition") which comprises a nitrile copolymer rubber (A1), (A2), or (A3) which has a predetermined composition and flat cellulose particles (B1) or (B2) with an aspect ratio of 30 to 600 in a predetermined ratio was small in gasoline permeation coefficient and excellent in tensile strength (Examples 1 to 7). In particular, in Examples 1 to 7, where the composition was produced by mixing in a dry state, even when produced by mixing in a dry state in this way, it can be confirmed that cross-linked rubber which was small in gasoline permeation coefficient and excellent in tensile strength was obtained.

On the other hand, when using organoclay with an aspect ratio of 200 instead of the flat cellulose particles (B) with an aspect ratio of 30 to 600, the result was an inferior gasoline permeation resistance (Comparative Example 1).

Furthermore, when using refined montmorillonite with an aspect ratio of 300 instead of the flat cellulose particles (B)

with an aspect ratio of 30 to 600, since the ingredients were mixed in the dry state, poor dispersion ended up occurring and as a result the obtained cross-linked rubber was inferior in tensile strength (Comparative Example 2).

The invention claimed is:

1. A nitrile copolymer rubber composition comprising:
a nitrile copolymer rubber (A) containing (i) 15 to 80 wt % of α,β-ethylenically unsaturated nitrile monomer units (a1), (ii) 20 to 85 wt % of conjugated diene monomer units (a2), and (iii) 0 to 30 wt % of cationic monomer units and/or monomer units able to form cations (a3), and
flat cellulose particles (B) with an aspect ratio of 30 to 600, wherein
a content of said flat cellulose particles (B) is 2 to 50 parts by weight with respect to 100 parts by weight of said nitrile copolymer rubber (A),
the flat cellulose particles (B) are crushed material, and
the aspect ratio of the flat cellulose particles (B) is the ratio between the surface average diameter and average thickness of the flat cellulose particles.

2. The nitrile copolymer rubber composition as set forth in claim 1, wherein said cationic monomer units and/or monomer units able to form cations (a3) are present at 0.1 to 30 wt % in said nitrile copolymer rubber (A).

3. The nitrile copolymer rubber composition as set forth in claim 1, wherein said nitrile copolymer rubber (A) is a hydrogenated nitrile copolymer rubber where at least part of the carbon-carbon unsaturated bond parts is hydrogenated.

4. The nitrile copolymer rubber composition as set forth in claim 1, further comprising 10 to 150 parts by weight of a vinyl chloride resin and/or acrylic resin with respect to 100 parts by weight of said nitrile copolymer rubber (A).

5. The nitrile copolymer rubber composition as set forth in claim 1, wherein said flat cellulose particles (B) have a volume average particle size of 0.05 to 100 μm, and the volume average particle size is measured by a laser diffraction/scattering particle size analyzer.

6. The nitrile copolymer rubber composition as set forth in claim 1, which is obtained by mixing said nitrile copolymer rubber (A) and said flat cellulose particles (B) in a dry state.

7. A cross-linkable nitrile copolymer rubber composition obtained by adding, to the nitrile copolymer rubber composition as set forth in claim 1, a cross-linking agent.

8. A cross-linked rubber obtained by cross-linking the cross-linkable nitrile copolymer rubber composition as set forth in claim 7.

9. The cross-linked rubber as set forth in claim 8, which is a hose, seal, packing, or gasket.

* * * * *